Patented Apr. 26, 1949

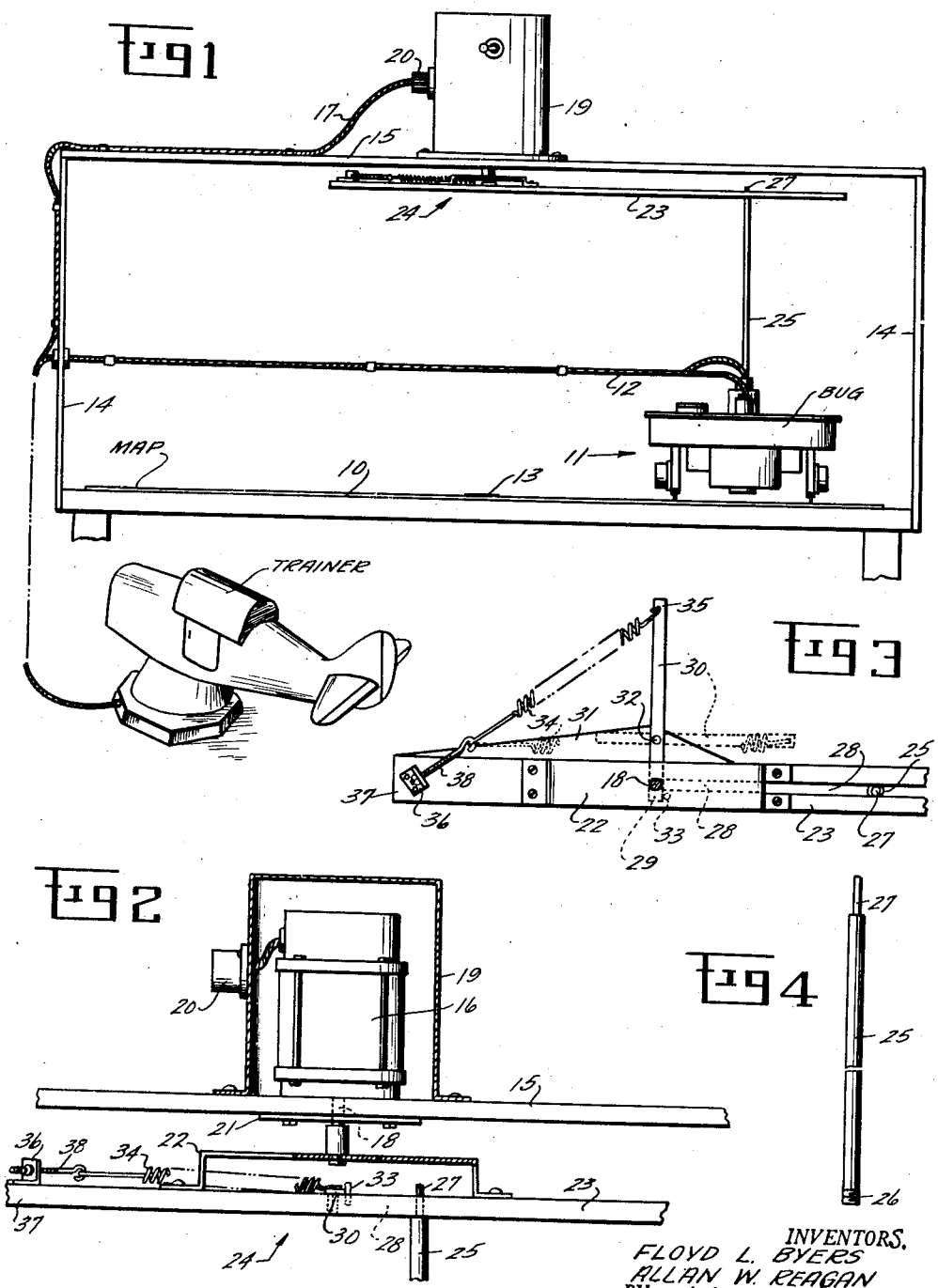

2,468,033

UNITED STATES PATENT OFFICE 2,468,033

AUTOMATIC RADIO COMPASS CONTROL FOR LINK TRAINERS

Floyd L. Byers and Allan W. Reagan, Langley Field, Va.

Application February 12, 1948, Serial No. 7,908

3 Claims. (Cl. 346—8)

(Granted under the act of March 3, 1883, as amended April 30, 1928; 370 O. G. 757)

The invention described herein may be manufactured and used by or for the Government for governmental purposes without payment to us of any royalties thereon.

In the use of the Link trainer for the purpose of teaching blind flying, it is important for the student to be aware of the crossing by the recorder or "bug," of a simulated radio-compass station. As soon as such a point, occupied by the hypothetical station on the chart, is crossed by the recorder, 180° is to be added to the bearing of that station from the student pilot's assumed position, which is that of the recorder.

Several solutions for the problem of ascertaining the bearing of compass stations have been proposed for use in connection with Link trainers. Such solutions have contemplated the use of rod connections between the station locality and indicator - positioning motion - transmission means. No solution for adding the 180° suddenly has heretofore appeared.

One object of the invention is to simulate the swing of the radio compass pointer as observed in the air when a radio compass station is passed, thereby suddenly adding 180° to the instrumental angle to be observed.

Another object is to provide light, cheap combination electrical and mechanical means for accomplishing the foregoing result expeditiously and accurately.

Another object is to provide apparatus capable of accomplishing the above objects with a minimum of alteration to the Link trainer desk and recorder as at present manufactured.

In the drawings:

Fig. 1 is a side elevation of the upper part of a Link radio-range trainer desk, the conventional recorder therefor and a framework incorporating our invention mounted thereover.

Fig. 2 is an enlarged detail of the upper part of Fig. 1.

Fig. 3 is a plan view of the 180° automatic turn device.

Fig. 4 is a detail, partly broken away, of the compass position rod which forms a loose connection between the recorder and the automatic turn device.

In Fig. 1, 10 is the desk top surface and 11 is the recorder or "bug." 12 is the recorder cable which has been lengthened two feet more than the conventional to allow recorder passage over the entire table. The recorder travels on a map surface as is conventional. At point 13 on the map surface, there is a hypothetical radio-compass station which is assumed to be transmitting bearing data to the training airplane (not shown). A framework 14 is erected over the middle of the desk so that a shelf 15 is provided to support a radio compass synchro generator 16 directly over the radio compass station point 13. A radio compass cable 17 joins the generator 16 with a synchro motor (not shown) which is inside the training airplane and which indicates the angular position of the generator 16. 18 is the drive shaft of the synchro generator 16, the shaft being centered as exactly as possible over point 13.

Referring now to Fig. 2 it will be seen that generator 16 is bolted to shelf 15 and is preferably enclosed in a small housing 19 through which projects a multiple connector plug 20 for the cable 17. The shaft 18 passes through a holddown plate 21 which also functions as a bearing. The shaft 18 is tightly attached to a stirrup 22. The latter is, in turn, attached to a guide arm 23 which forms part of an automatic turn device 24.

The automatic turn device 24 comprises a compass position rod 25 (see Fig. 4) which is mounted vertically on the recorder 11 (see Fig. 1). For this purpose its lower end bears a thread 26 while its upper end has a small-diameter spindle 27. The latter normally projects upward through a slot 28 in the guide rod 23 (see Figs. 2 and 3). Since the resistance to turning of shaft 18 is very low, there is no difficulty arising from added load on the recorder 11. However, the automatic turning device 24 should be made of light materials.

The slot 28 in guide arm 23 extends to such a point on that arm that spindle portion 27 may move in toward it and make mechanical contact with the free end 29 of a turning arm 30. The latter is attached to a side extension 31 of guide arm 23 by a pivot 32. A stop lug 33 is provided to prevent the arm end 29 from moving further forward toward the slot 28 than would correspond to a perpendicular position of arm 30 in relation to the arm 23. A coil spring 34 is provided to place tension between the outer end 35 of turning arm 30 and an anchor 36 at the unslotted end 37 of guide arm 23. A screw adjustment 38 is provided to regulate the tension.

In operation, the recorder in its movements, turns guide arm 23. The angular motion of this arm serves to turn synchro-generator shaft 18, thereby causing the generator 16 to transmit an indication of the compass bearing of the Link airplane trainer to the cockpit instrument thereof to show the bearing in relation to the map on surface 10. If the recorder 11 should approach the point 13 directly, there would be no angular movement of the guide arm 23 but when the recorder was over point 13 (the site of the hypothetical radio-compass station) spindle portion 27 would make contact with end 29 turning arm 30 to such a degree that the perpendicular position of this arm in relation to guide arm 23 would be overbalanced and the turning arm 30 would assume a position substantially 180° from its original position shown in Fig. 3. This shift would also have an effect on guide arm 23, to rotate it 180°, or in other words, to shift it end for end. The generator would of course also be turned 180° and would transmit this indication to the synchro-motor actuated compass within the trainer. The pilot will so be notified that he has passed over the radio compass station.

We claim as our invention:

1. In combination with an airplane pilot trainer of the Link type, a recorder, a flat surface on which there is a point indicating a hypothetical radio compass station and over which surface said recorder is adapted to travel, a compass position rod attached substantially perpendicularly to said recorder, a slotted guide arm adapted to receive in its slot the upper end of said compass position rod, a synchro-generator having a drive shaft centered over said hypothetical radio compass station, means pivoting said guide arm on said drive shaft and an automatic turning device adapted to turn said guide arm 180° from its previously occupied position whenever said compass position rod enters said slot to such an extent that said rod passes over the point indicating the hypothetical radio compass station, said automatic turning device including a turning arm pivoted at the side of said guide arm opposite the inner end of the slot therein, a coil spring and two anchorages therefor, one being located at the unslotted end of said guide rod and the other at the outer end of said turning arm, said turning arm extending across the inner end of the slot in said guide arm.

2. The combination set forth in claim 1 with the addition of a stop lug on said guide arm in such a position whereby to hold said turning arm substantially perpendicular to said guide arm.

3. In combination with a student pilot trainer in which the theoretical course followed is indicated by a recorder traveling over a map on a flat surface, a radio compass control which comprises a synchro-generator mounted directly above a point on the flat surface representing a radio compass station, said generator having a rotor shaft, a compass guide arm having a longitudinal slot extending substantially from its middle point to one end thereof, a stirrup attaching said guide arm to said rotor shaft, an automatic turning arm pivoted on said guide arm beneath said stirrup, a coil spring and an adjustable anchorage for said spring on said arm, another anchorage on the outer end of said turning arm and means on said recorder for traversing the slot in said guide arm in proportion to the approach that said recorder makes toward said point which represents the radio-compass station, said means, spring and turning arm adapted to cause a swing of 180° of said guide arm when said recorder passes over said radio compass indicating point whereby to cause said synchro generator to transmit an added 180° of angular indication.

FLOYD L. BYERS.
ALLAN W. REAGAN.

No references cited.